(12) United States Patent
Davison

(10) Patent No.: US 10,173,939 B2
(45) Date of Patent: Jan. 8, 2019

(54) FOOD-GRADE FERTILIZER FOR CROPS

(71) Applicant: Mid-America Distributing, LLC, Fairmont, MN (US)

(72) Inventor: Bruce H. Davison, Fairmont, MN (US)

(73) Assignee: Mid-America Distributing, LLC, Fairmont, MN (US)

( * ) Notice: Subject to any disclaimer, the term of this patent is extended or adjusted under 35 U.S.C. 154(b) by 359 days.

(21) Appl. No.: 13/797,191

(22) Filed: Mar. 12, 2013

(65) Prior Publication Data

US 2014/0274719 A1 Sep. 18, 2014

(51) Int. Cl.
| | |
|---|---|
| *C05G 3/00* | (2006.01) |
| *A01C 1/06* | (2006.01) |
| *C05D 9/02* | (2006.01) |
| *C05F 11/10* | (2006.01) |
| *C05G 1/00* | (2006.01) |

(52) U.S. Cl.
CPC ............... *C05G 3/00* (2013.01); *A01C 1/06* (2013.01); *C05D 9/02* (2013.01); *C05F 11/10* (2013.01); *C05G 1/00* (2013.01)

(58) Field of Classification Search
CPC .... C05G 3/00; C05G 1/00; A01C 1/06; C05F 11/10; C05D 9/02
See application file for complete search history.

(56) References Cited

U.S. PATENT DOCUMENTS

| | | | |
|---|---|---|---|
| 4,581,056 A * | 4/1986 | Nooden et al. ............... 71/28 |
| 5,549,729 A * | 8/1996 | Yamashita ............... A01C 1/06 71/11 |
| 6,241,795 B1 | 6/2001 | Svec et al. |
| 6,471,741 B1 * | 10/2002 | Reinbergen ............ A01N 63/00 435/243 |
| 2004/0062842 A1 * | 4/2004 | Kosaka ................... A23B 7/00 426/248 |
| 2005/0204791 A1 * | 9/2005 | Rogers et al. ................... 71/25 |
| 2007/0271627 A1 * | 11/2007 | Ye ...................... C12N 15/8205 800/278 |
| 2010/0240534 A1 * | 9/2010 | Grech ...................... A01N 3/00 504/124 |
| 2012/0015805 A1 * | 1/2012 | Goodwin ................. A01C 1/06 504/100 |

FOREIGN PATENT DOCUMENTS

| | | | |
|---|---|---|---|
| CN | 102246630 | * | 11/2011 |
| EP | 1 137 614 B1 | | 3/2000 |
| WO | WO 2005/077861 A1 | | 8/2005 |
| WO | WO 2005/112607 | * | 12/2005 |
| WO | WO 2011/120035 | * | 9/2011 |

OTHER PUBLICATIONS

Feng et al., CN 102246630, published: Nov. 2011, English Machine Translataion accessed on Feb. 22, 2015.*

* cited by examiner

*Primary Examiner* — Johann R Richter
*Assistant Examiner* — Genevieve S Alley
(74) *Attorney, Agent, or Firm* — Merchant & Gould P.C.

(57) ABSTRACT

The disclosure relates to fertilizer compositions and methods of using the compositions to grow crops. The disclosed compositions are especially useful at growing crops under drought or nutrient-deprived conditions.

15 Claims, No Drawings

FOOD-GRADE FERTILIZER FOR CROPS

BACKGROUND

Farmland is increasingly attractive for non-food uses like energy production, non-food crops and population growth. But, the demand for food is increasing, which means that crops like corn, wheat and soybeans must be especially efficient in order to meet demand using less land. In this environment, droughts have a devastating impact on farmers, crop yields, and the ability of people to feed their families. Farms can go out of business because crop yields are too low to cover expenses, livestock herds can die, and low crop yields leads to higher feed costs and higher food and milk prices.

Additionally, the demand for farmland has led to an interest in converting previously unattractive land into farmland, including dry land in arid environments and land that is not as nutrient-dense as premium farmland.

It is against this background that the present disclosure is made.

SUMMARY

Surprisingly, it has been discovered that the disclosed compositions are effective at fertilizing agriculture crops, even under drought or nutrient-deficient conditions.

Accordingly, in one aspect, the present disclosure relates to fertilizer compositions with macro- and micronutrients, a plant growth regulator, and optional additional materials.

In another aspect, the present disclosure relates to the use of the disclosed compositions as a fertilizer for agriculture crops with macro- and micronutrients, a plant growth regulator, and optional additional materials.

In another aspect, the present disclosure relates to the use of the disclosed compositions as soil amendments for agriculture crops with micronutrients, a plant growth regulator, and optional additional materials and optional macronutrients.

These and other embodiments will be apparent to those skilled in the art and others in view of the following description of some embodiments. It should be understood that this summary and the detailed description illustrate only some examples of various embodiments and are not intended to be limiting to the claimed invention.

DETAILED DESCRIPTION

Providing water and nutrients to plants is an ongoing process with crops from planting to harvest. Plants derive nutrients from those naturally found in the soil and from applied fertilizers. Plants derive water from the top layers of the soil, which is also where the water is likely to evaporate from in dry conditions. Even under dry conditions, water remains in the deeper layers of soil. Without wanting to be bound by theory, it is believed that the disclosed compositions improve a plant's ability to access water in deeper layers of soil along with the nutrients that are found there. This allows the plant to go longer in between rain or watering and longer in between fertilizer applications without adversely affecting plant health or crop yields. As a result, the crops are drought-resistant and can thrive in nutrient-deprived environments.

The disclosed compositions are suitable for use with various food and non-food crops. Exemplary crops include cereal crops like corn, wheat, barley, sorghum, millet, oats, triticale, rye, buckwheat, fonio, and quinoa, vegetable crops like soybeans, sugarbeets, sugarcane, rice, potatoes, pumpkin, broccoli, cauliflower, artichokes, capers, peas, beans, edible greens like kale, spinach, arugula, bok choy, chard, endive, lettuce, watercress, leeks, Brussels sprouts, kohlrabi, ginger, celery, rhubarb, sweet potatoes, yams, carrots, parsnips, beets, radishes, rutabagas, turnips, onions, shallots, garlic, tomatoes, cucumbers, squash, zucchinis, peppers, eggplant, tomatillos, avocado, green beans, fruit and nut crops like strawberries, coconuts, almonds, walnuts, peanuts, hazelnuts, blueberries, cranberries, raspberries, blackberries, apples, pears, pineapple, eggplant, pomegranate, kiwi, grapes, melons, citrus fruit like orange, lemon, lime, grapefruit, and fiber crops like cotton, hemp, and flax, and hay.

The disclosed compositions may also be used to treat gardens or houseplants.

The Fertilizer Compositions

The disclosed fertilizer compositions can be concentrate or ready-to-use liquids, thickened liquids, gels, powders, granules, pellets, blocks, or tablets. A concentrate composition refers to a product that is diluted with water before being applied to the crops. A ready-to-use composition refers to a product that is applied to a crop without dilution. When provided as a liquid, thickened liquid, or gel, the composition can be a concentrate that is diluted with water before being applied to the crop. This allows for less product to be shipped and stored. The product can also be provided as a ready-to-use liquid. When provided as a solid, especially a powder, granule, or pellet, the solid can be applied as a ready-to-use product where the product is scattered around the crops. The product can also be provided as a solid concentrate that is diluted with water before being applied to the crop. In some embodiments, the composition is a ready-to-use liquid. In some embodiments, the disclosed composition is provided as a two-part composition. In some embodiments, the disclosed composition is provided as a one-part composition.

In some embodiments, the compositions have less than 50 ppm, 10 ppm or 1 ppm heavy metals. In some embodiments, the compositions are free of heavy metals such as arsenic, cadmium, lead and mercury. In some embodiments, the compositions are made up of food-grade materials. In some embodiments, the compositions are considered GRAS.

The compositions preferably have a pH from about 5.5 to about 7.5, from about 6 to about 7, or about 6.5. The compositions preferably have a salt index of about 30 to about 60, about 30 to about 50, or about 30 to about 40.

The disclosed compositions may include macro- and micronutrients, a plant growth regulator, and optional additional materials. Each will be discussed in greater detail.

Macronutrients

The disclosed compositions may include one or more macronutrients. Exemplary macronutrients include nitrogen, phosphorous, and potassium.

Nitrogen can be found in materials including but not limited to urea, aqua ammonium, ammonium nitrate, ammonium phosphate, ammonium sulfate, urea phosphate, ammonium molybdate, and mixtures thereof. Exemplary concentrations of nitrogen in the ready-to-use compositions can include from about 0.1 to about 20%, from about 0.5 to about 15% or from about 1 to about 10% of elemental nitrogen per hundred-weight or per 100 pounds of fertilizer. In some embodiments, the disclosed compositions may also be free of nitrogen. In some embodiments, the concentration of nitrogen is not greater than 10% per hundred-weight.

Phosphorous can be found in materials including but not limited to orthophosphate, potassium phosphate, ammonium phosphate, phosphorous acids and their salts, phosphite, food grade phosphoric acid, and salts and mixtures thereof. Phosphorous concentration is typically reported as the concentration of $P_2O_5$. Exemplary concentrations of phosphorous in the ready-to-use composition can include from about 0.1 to about 40%, from about 10 to about 30%, or from about 15 to about 25% per hundred-weight as measured as $P_2O_5$. The elemental weight of phosphorous can be converted to $P_2O_5$ by multiplying the concentration of elemental phosphorous by 2.29. In some embodiments, the disclosed compositions may also be free of phosphorous.

Potassium can be found in materials including but not limited to potassium chloride, potassium sulfate, potassium carbonate, potassium nitrate, potassium hydroxide, potassium phosphate, and mixtures thereof. Potassium concentration is typically measured as the equivalent of potassium oxide or $K_2O$. Exemplary concentrations of potassium in the ready-to-use composition can include from about 0.1 to about 30%, from about 1 to about 25%, or from about 5 to about 20% per hundred-weight of $K_2O$. The elemental weight of potassium can be converted to $K_2O$ by multiplying the concentration of elemental potassium by 1.2. The disclosed compositions may also be free of potassium.

The above concentrations are particularly suited for application to agricultural seeds. While the above concentrations have been described as ready-to-use concentrations, it is understood that those concentrations may be further diluted. For example, the compositions can be diluted and used for applications that allow for a more dilute product such as gardening or foliar applications to agricultural crops. These ready-to-use concentrations may also be diluted and applied to seed but in larger volumes.

In some embodiments, the disclosed compositions include a combination of nitrogen, phosphorous, and potassium in a desired ratio. Exemplary exact or approximate ratios of nitrogen:phosphorous:potassium include 3:18:18, 6:10:4, 6:24:6, 7:5:5, 7:17:7, 9:13:7, 18:6:12, 19:8:10, 20:3:3, 25:4:4, 28:4:4, 32:10:10, and the like. In some embodiments, the macronutrients have less than 50 ppm, 10 ppm or 1 ppm heavy metals. In some embodiments, the macronutrients are free of heavy metals such as arsenic, cadmium, lead and mercury.

Micronutrients

The disclosed compositions may include one or more micronutrients. Exemplary micronutrients include zinc, copper, manganese, iron, boron, calcium, magnesium, sulfur, and mixtures thereof. These micronutrients can be provided unchelated, partially chelated, or fully chelated.

Zinc can be found in materials including but not limited to zinc-ammonia complexes, zinc oxide, zinc sulfate, zinc chelate, and mixtures thereof. Exemplary concentrations of elemental zinc in the ready-to-use compositions can include from about 0.03 to about 1% per hundred-weight.

Copper can be found in materials including but not limited to copper chelate, copper sulfate, cupric oxide, cuprous oxide, and mixtures thereof. Exemplary concentrations of elemental copper in the ready-to-use compositions can include from about 0.035 to about 0.07% per hundred-weight.

Manganese can be found in materials including but not limited to manganese carbonate, manganese chelate, manganese chloride, manganese dioxide, manganese oxide, manganese sulfate, and mixtures thereof. Exemplary concentrations of elemental manganese in the ready-to-use compositions can include from about 0.01 to about 1% per hundred-weight.

Iron can be found in materials including but not limited to iron chelate such as FeDTPA, FeEDTA and FeEDDHA, ferrous ammonium sulfate, ferrous sulfate and mixtures thereof. Exemplary concentrations of elemental iron in the ready-to-use compositions can include from about 0.1 to about 1% per hundred-weight.

Boron can be found in materials including but not limited to sodium borate, sodium pentaborate, borax, boric acid, sodium tetraborate, solubor, and mixtures thereof. Exemplary concentrations of elemental boron in the ready-to-use compositions can include from about 0.1 to about 1% per hundred-weight.

Calcium can be found in materials including but not limited to, calcium nitrate, calcitic lime, dolomitic lime, gypsum, ordinary superphosphate, papermill lime sludge, slaked lime, triple superphosphate, and mixtures thereof. Exemplary concentrations of elemental calcium in the ready-to-use compositions can include from about 0.1 to about 1% per hundred-weight.

Magnesium can be found in materials including but not limited to magnesium sulfate, magnesium nitrate, dolomitic lime, Epsom salts, kieserite, potassium magnesium sulfate, and mixtures thereof. Exemplary concentrations of elemental magnesium in the ready-to-use compositions can include from about 0.1 to about 1% per hundred-weight.

Sulfur can be found in materials including but not limited to ammonium sulfate, ammonium thiosulfate, magnesium sulfate, ordinary superphosphate, potassium magnesium sulfate, potassium sulfate, calcium sulfate, elemental sulfur, and mixtures thereof. Exemplary concentrations of elemental sulfur in the ready-to-use compositions can include from about 0.1 to about 1% per hundred-weight.

Plant Growth Regulators

The disclosed compositions include at least one plant growth regulator. Exemplary plant growth regulators include auxins, cytokinins, ethylene, gibberellins, Exemplary auxins include 1-maphthleneacetic acid, indole-3-butyric acid, indole-3-acetic acid, and mixtures thereof. Exemplary cytokinins include kinetin, zeatin, 6-benzylaminopurine, diphenylurea, thidiazuron, and mixtures thereof. Exemplary gibberellins include dihydroxylated gibberellins such as gibberellic acid (GA3) and the gibberellins GA1 through GAn. Other plant growth regulators include ethylene, jasmonates such as jasmonic acid and methyl jasmonate, and polyamines. In some embodiments, more than one class of plant growth regulators are included. In some embodiments, the plant growth regulator is gibberellic acid. In some embodiments, the plant growth regulator is gibberellic acid plus another plant growth regulator.

Exemplary concentrations of the plant growth regulator in the ready-to-use concentration can include from about 0.5 to about 10 ppm per hundred-weight, from about 1 to about 5 ppm per hundred-weight, or from about 1 to about 2 ppm per hundred-weight.

Additional Materials

The disclosed compositions may optionally include additional materials such as vitamins, amino acids, carbohydrates, polysaccharides, beneficial microorganisms, and mixtures thereof.

Exemplary vitamins include niacin, d-biotin, riboflavin, ascorbic acid, thamine mononitrate, thiamine hygrochloride, pyridoxine hydrochloride, folic acid, and derivatives and mixtures thereof.

Exemplary amino acids include alanine, arginine, aspartic acid, betaines, choline, cysteine, glutamic acid, glycine, histidine, isoleucine, leucine, lysine, methionine, phenylalanine, proline, serine, threonine, tryptophan, tyrosine, valine, and mixtures and derivatives thereof.

Exemplary carbohydrates and polysaccharides include alginic acid, mannitol, laminarin, succinic acid, sorbitol, fructose, sucrose, dextrose, lactose, and derivatives and mixtures thereof. The compositions can also include carbon.

As discussed above, in some embodiments, the disclosed compositions may include a soil amendment with one or more micronutrients, a plant growth regulator, and optional additional materials and optional macronutrients. The soil amendments may also be free of macronutrients. The purpose of a soil amendment is to provide targeted application of one or more micronutrients that are naturally lacking in the soil. In these applications, it may not be necessary to also provide macronutrients. The concentrations of micronutrients and plant growth regulators in a soil amendment would be similar to those described above.

Methods of Use

As discussed, the disclosed compositions may be provided as a concentrate that is diluted with water to form a ready-to-use composition, or may be provided as a ready-to-use composition. The disclosed compositions may be applied to a seed or plant by scattering, sprinkling, spraying, misting, foaming, dusting, injecting, or applying with a targeted application such as a 2×2 seed application. As an example, the ready-to-use composition may be a solid that is scattered around a plant or may be a liquid that is applied around or on a plant.

In some embodiments, it may be desirable for the composition to be applied to the seed during planting. This allows the plant to obtain the most benefit from the composition and develop the strongest root system. This will then allow the developed plant to access more water and nutrients which in turn makes it more drought resistant.

In some embodiments, when applying the composition to the seeds, the composition may be applied 2 inches from the seed and 2 inches into the soil. In other embodiments, the compositions may be applied to either side of the seed, in front or in back of the seed in the row, or even on the seed. In some embodiments, it may be desirable to not apply the compositions directly to the seed. It may be desirable for the compositions to be applied at the same soil depth of the seed versus above the seed on top of the dirt. When applying the composition with seed planting, the composition may be applied at a rate of about 0.5 to about 25, about 1 to about 20, or about 3 to about 15 gallons per acre. In some embodiments, it may be desirable to apply or re-apply the composition to the plant leaves.

In some embodiments, when the compositions are applied with seed planting, the mature plant will have a root mass that is at least about 50%, at least about 75%, at least about 100%, at least about 150%, or at least about 200% larger than an untreated mature plant.

It may be desirable to foliar-apply the composition. This may be a single application, may be part of a series of foliar applications, or may be done in conjunction with an earlier seed application. When applying the composition to the leaves, the composition may be applied at a rate of about 0.1 to about 10, about 0.5 to about 5, or about 1 to about 3 gallons per acre.

The following examples and test data provide an understanding of certain specific embodiments. The examples are not meant to limit the scope that has been set forth in the foregoing description. Variations within the disclosed concepts are apparent to those skilled in the art.

EXAMPLES

Twenty-six replicates of three different experimental products were evaluated against existing compositions in the field to determine yield results. The three products were as follows:

Cleanfield 6% EDDHA Iron (an experimental iron soil amendment with 1 ppm of gibberelic acid, commercially available from Mid-America Distributing, LLC) versus Soygreen® Iron (an iron soil supplement with no gibberelic acid, commercially available from West Central Chemical) applied at 1 gallon per acre near Prosper, N. Dak. on sugarbeets and soybeans;

Fast Start (an experimental 7:17:7 fertilizer with 1 ppm of gibberelic acid, commercially available from Mid-America Distributing, LLC) applied at 2.5 gallons per acre versus 10-34-0 (commercially available from Simplot) near Ada, Minn. on corn and sugarbeets; and Cleanfield Extra (an experimental 3:18:18 fertilizer with 1 ppm of gibberelic acid, commercially available from Mid-America Distributing, LLC) applied at 10 gallons per acre versus a 200 bushel yield goal application of dry phosphorous and dry potassium (bulk product purchased from Agrium and then blended), both with added urea near Ada, Minn. on corn. The Cleanfield Extra formulation has approximately ⅓ fewer plant nutrients than the dry phosphorus and potassium product.

The bulk dry phosphorous and dry potassium were applied to seed with a broadcast application at planting. The remaining fertilizers were applied at planting 2 inches from the seed and 2 inches into the soil. Planting took place around May 1. During the growing season, no additional fertilizers were applied to the crops. The crops were harvested in October and yields evaluated based on the harvested crops. The results are shown in Table 1. During the growing season, Ada, Minn. received ¼ to ½ inch less rainfall that Prosper, N. Dak. Further, the soil in Ada, Minn. is sandier than in Prosper, N. Dak. and contains 2% organic matter.

TABLE 1

| Crop | Experimental Fertilizer | Comparative Fertilizer |
| --- | --- | --- |
|  | Cleanfield 6% EDDHA Iron | Soygreen ® Iron |
| Soybeans | 43.23 bushels/acre | 43.40 bushels/acre |
| Sugarbeets | 34 tons | 34.5 tons |
|  | Fast Start | 10-34-0 |
| Corn | 187 bushels/acre | 179 bushels/acre |
| Sugarbeets | 34.5 tons | 32 tons |
|  | Cleanfield Extra | dry phosphorous and dry potassium, plus added urea |
| Corn | 176.4 bushels/acre | 174 bushels/acre |

Table 1 shows that the addition of gibberelic acid to the iron amendment Cleanfield 6% EDDHA Iron did not provide a benefit when used on soybean and sugarbeet crops. It may be possible that the benefits of gibberelic acid might not be noticeable if the crops were not water deprived, especially since soybeans and sugarbeets are less water demanding crops, compared, for example, to corn.

Table 1 also shows that Fast Start used less nitrogen and phosphorous than the 10-34-0 fertilizer and slightly outperformed the 10-34-0 formulation on corn and sugarbeet yields.

Finally, Table 1 shows that the Cleanfield Extra formulation resulted in better yields on corn, which requires more water than other plants and is therefore more susceptible to drought conditions. The Cleanfield Extra was applied using a targeted 2×2 application versus the broadcast application of the dry phosphorous and potassium product and used fewer plant nutrients. This data shows that the Cleanfield Extra formulation, with the gibberelic acid, provides a more efficient and more economical fertilizer for use on drought-susceptible crops.

The above specification, examples and data provide a complete description of the disclosed compositions and their use. Since many embodiments can be made without departing from the spirit and scope of the invention, the invention resides in the claims.

What is claimed is:

1. A method of fertilizing crop seeds during planting consisting of:
   applying a fertilizer composition to crop seeds during planting at a rate of about 0.5 to about 25 gallons per acre, wherein the seeds are planted in soil, the fertilizer composition consisting of:
   i. from about 0.1 to about 10% of a nitrogen-containing material as measured as elemental nitrogen;
   ii. from about 0.1 to about 40% of a phosphorous-containing material as measured as the concentration of $P_2O_5$;
   iii. from about 0.1 to about 30% of a potassium-containing material as measured as the concentration of $K_2O$;
   iv. from about 0.1 to about 1% of a micronutrient selected from the group consisting of zinc, copper, iron, manganese, boron, calcium, magnesium, sulfur, and mixtures thereof;
   v. from about 1 ppm to about 5 ppm gibberellic acid and an optional plant growth regulator selected from the group consisting of 1-naphthleneacetic acid, indole-3-butryic acid, indole-3-acetic acid, kinetin, zeatin, 6-benzylaminopurine, diphenylurea, thidiazuron, ethylene, jasmonic acid, methyl jasmonate, polyamines, and mixtures thereof; and
   vi. optionally, an additional functional ingredient selected from the group consisting of vitamins, amino acids, carbohydrates, polysaccharides, beneficial microorganisms, carbon, and mixtures thereof;
   wherein applying the fertilizer composition to the seed results in an increase of root mass of at least 50% in a mature plant.

2. The method of claim 1, wherein the nitrogen-containing material is selected from the group consisting of urea, aqua ammonium, ammonium nitrate, ammonium phosphate, ammonium sulfate, urea phosphate, ammonium molybdate, and mixtures thereof.

3. The method of claim 1, wherein the phosphorous-containing material is selected from the group consisting of orthophosphate, potassium phosphate, ammonium phosphate, phosphorous acids and their salts, phosphite, food grade phosphoric acid and salts thereof, and mixtures thereof.

4. The method of claim 1, wherein the potassium-containing material is selected from the group consisting of potassium chloride, potassium sulfate, potassium carbonate, potassium nitrate, potassium hydroxide, potassium phosphate, and mixtures thereof.

5. The method of claim 1, wherein the micronutrients are selected from the group consisting of zinc, iron, and copper.

6. The method of claim 1, wherein the composition is a ready-to-use liquid.

7. The method of claim 1, wherein the composition has less than 50 ppm of heavy metals.

8. The method of claim 1, wherein the composition is considered GRAS.

9. The method of claim 1, wherein the composition has a pH from about 5.5 to about 7.5.

10. The method of claim 1, wherein the composition has a salt index from about 30 to about 60.

11. The method of claim 1, wherein the concentration of nitrogen is less than 10% as measured as elemental nitrogen.

12. The method of claim 1, wherein the composition has less than 10 ppm of heavy metals.

13. The method of claim 1, wherein the composition has less than 1 ppm of heavy metals.

14. The method of claim 1, wherein the composition has a pH from about 6 to about 7.

15. The method of claim 1, wherein the composition has a pH of about 6.5.

* * * * *